US008554556B2

(12) United States Patent
Yu

(10) Patent No.: US 8,554,556 B2
(45) Date of Patent: Oct. 8, 2013

(54) MULTI-MICROPHONE VOICE ACTIVITY DETECTOR

(75) Inventor: Rongshan Yu, Singapore (SG)

(73) Assignee: Dolby Laboratories Corporation, San Francisco, CA (US)

( * ) Notice: Subject to any disclaimer, the term of this patent is extended or adjusted under 35 U.S.C. 154(b) by 483 days.

(21) Appl. No.: 13/001,334

(22) PCT Filed: Jun. 25, 2009

(86) PCT No.: PCT/US2009/048562
§ 371 (c)(1),
(2), (4) Date: Dec. 23, 2010

(87) PCT Pub. No.: WO2010/002676
PCT Pub. Date: Jan. 7, 2010

(65) Prior Publication Data
US 2011/0106533 A1 May 5, 2011

Related U.S. Application Data

(60) Provisional application No. 61/077,087, filed on Jun. 30, 2008.

(51) Int. Cl.
*G10L 15/20* (2006.01)

(52) U.S. Cl.
USPC ........................................................ 704/233

(58) Field of Classification Search
USPC ........................................................ 704/233
See application file for complete search history.

(56) References Cited

U.S. PATENT DOCUMENTS

| | | | | |
|---|---|---|---|---|
| 5,572,621 | A | 11/1996 | Martin | |
| 7,117,145 | B1 * | 10/2006 | Venkatesh et al. | 704/200 |
| 7,146,315 | B2 * | 12/2006 | Balan et al. | 704/233 |
| 7,171,003 | B1 * | 1/2007 | Venkatesh et al. | 381/66 |
| 7,174,022 | B1 * | 2/2007 | Zhang et al. | 381/92 |
| 8,340,309 | B2 * | 12/2012 | Burnett et al. | 381/71.6 |
| 2003/0179888 | A1 | 9/2003 | Burnett | |
| 2003/0228023 | A1 | 12/2003 | Burnett | |
| 2007/0038442 | A1 * | 2/2007 | Visser et al. | 704/233 |
| 2010/0323652 | A1 * | 12/2010 | Visser et al. | 455/232.1 |
| 2011/0038489 | A1 * | 2/2011 | Visser et al. | 381/92 |

FOREIGN PATENT DOCUMENTS

| | | |
|---|---|---|
| EP | 0386765 | 9/1990 |
| WO | 2007091956 | 8/2007 |

OTHER PUBLICATIONS

Kondoz, et al., "Voice Activity Detection", 2004 John Wiley & Sons, Ltd., ISBN 0-470-87007-9 (HB) pp. 357-377.
Kondoz, "Speech Enhancement", 2004 John Wiley & Sons Ltd., ISBN 0-470-87007-9, pp. 379-607.
Ryan, et al., "Optimum Near-Field Response for Microphone Arrays".
Hoshuyama, et al., "A Realtime Robust Adaptive Microphone Array Controlled by an SNR Estimate", Proceedings of the 1998 IEEE International Conference on Acoustics, Speech and Signal Processing, 1998, pp. 3605-3608.

(Continued)

*Primary Examiner* — Michael N Opsasnick

(57) ABSTRACT

A dual microphone voice activity detector system is presented. A voice activity detector system estimates the signal level and noise level at each microphone. A level differential between the two microphones of nearby sounds such as the signal is greater than the level differential of more distant sounds such as the noise. Thus, the voice activity detector detects the presence of nearby sounds.

23 Claims, 2 Drawing Sheets

300

(56) References Cited

OTHER PUBLICATIONS

Preliminary Search Report dated Mar. 29, 2008.

Zheng, et al., "Experimental Evaluation of a Nested Microphone Array with Adaptive Noise Cancellers" vol. 53, No. 3 Jun. 2004, pp. 777-786.

* cited by examiner

MULTI-MICROPHONE VOICE ACTIVITY DETECTOR

CROSS-REFERENCE TO RELATED APPLICATIONS

This Application claims the benefit of, including priority to, co-pending U.S. Provisional Patent Application No. 61/077,087 filed 30 Jun. 2008 by Rongshan Yu entitled "Multi-microphone Voice Activity Detector and assigned to the Assignee of the present Application" (with Dolby Laboratories Reference No. D08006US01).

TECHNOLOGY

The present invention relates to voice activity detectors. More particularly, embodiments of the present invention relate to voice activity detectors using two or more microphones.

BACKGROUND

Unless otherwise indicated herein, the approaches described in this section are not prior art to the claims in this application and are not admitted to be prior art by inclusion in this section.

One function of a Voice Activity Detector (VAD) is to detect the presence or absence of human speech in the regions of audio signal recorded by a microphone. VAD plays a role in many speech processing systems, in the context that different processing mechanisms are used on the input signal regarding whether speech is present in it or not as decided by the VAD module. In these applications, accurate and robust VAD performance may affect overall performance. For example, in voice communication system DTX (discontinue transmission) is usually used to improve the bandwidth usage efficiency. In such a system, VAD is used to decide whether speech is present or not in the input signal and the actual transmission of speech signal is stopped if speech is not present. Here misclassification of speech as disturbance may result in speech drop-off in the transmitted signal, and affect its intelligibility. As an example, in a speech enhancement system it is generally required to estimate the level of the disturbance signal in the recorded signal. This is usually done with the help from a VAD where the disturbance level is estimated from the regions that contain disturbance signal only. See, for example, A. M. Kondoz, Digital Speech Coding for Low Bit Rate Communication Systems, ch. 11 (John Wiley & Sons, 2004). In this case, an inaccurate VAD may lead to either over-estimate or under-estimate of the disturbance level, which may eventually lead to suboptimal speech enhancement quality.

Various VAD systems have been previously proposed. See, for example, A. M. Kondoz, Digital Speech Coding for Low Bit Rate Communication Systems, ch. 10 (John Wiley & Sons, 2004). Some of these systems exploit the statistical aspects of the difference between the target speech and the disturbance, and rely on threshold comparison methods to differentiate that target speech from the disturbance signals. The statistical measurements that had been previously used in these systems include energy levels, timing, pitch, zero crossing rates, periodicity measurement, etc. Combination of more than one statistical measurement is used in more sophisticated systems to further improve the accuracy of the detection results. In general, statistical methods achieve good performance when the target speech and the disturbance have very distinguished statistical features, for example when the disturbance has a level that is steady, and lying below the level of the target speech. However, in a more adverse environment it becomes a very challenging task to maintain the good performance, in particular when the target signal level to disturbance level ratio is low or the disturbance signal has speech-like characteristics.

VAD in combination with a microphone array can also be found in some robust adaptive beamforming system designs. See, for example, O. Hoshuyama, B. Begasse, A. Sugiyama, and A. Hirano, "A real time robust adaptive microphone array controlled by an SNR estimate," Proceedings of the 1998 IEEE International Conference on Acoustics, Speech and Signal Processing, 1998. Those VAD are based the difference in the levels of different outputs of the microphone beamforming system, where the target signal is present only in one output and it is blocked for the other outputs. The effectiveness of such a VAD design may thus relate to the capability of the beamforming system in blocking the target signal for those outputs, which may be expensive to achieve in real-life systems.

Other references that may be pertinent to this background, but which are not to be considered prior art to the example inventive embodiments that will be described in the sections following, include:

Reference No. 1: A. M. Kondoz, Digital Speech Coding for Low Bit Rate Communication Systems, ch. 10, John Wiley & Sons, 2004;

Reference No. 2: A. M. Kondoz, Digital Speech Coding for Low Bit Rate Communication Systems, ch. 11, John Wiley & Sons, 2004;

Reference No. 3: J. G. Ryan and R. A. Goubran, "Optimal nearfield responses for microphone array," in Proc. IEEE Workshop applicat. Signal Processing to Audio Acoust., New Paltz, N.Y., USA, 1997;

Reference No. 4: O. Hoshuyama, B. Begasse, A. Sugiyama, and A. Hirano, "A real time robust adaptive microphone array controlled by an SNR estimate," Proceedings of the 1998 IEEE International Conference on Acoustics, Speech and Signal Processing, 1998;

Reference No. 5: US20030228023A1/WO03083828A1/CA2479758AA Multichannel voice detection in adverse environments; and Reference No. 6: U.S. Pat. No. 7,174,022 Small array microphone for beam-forming and noise suppression.

DESCRIPTION OF EXAMPLE EMBODIMENTS

Figure 1:
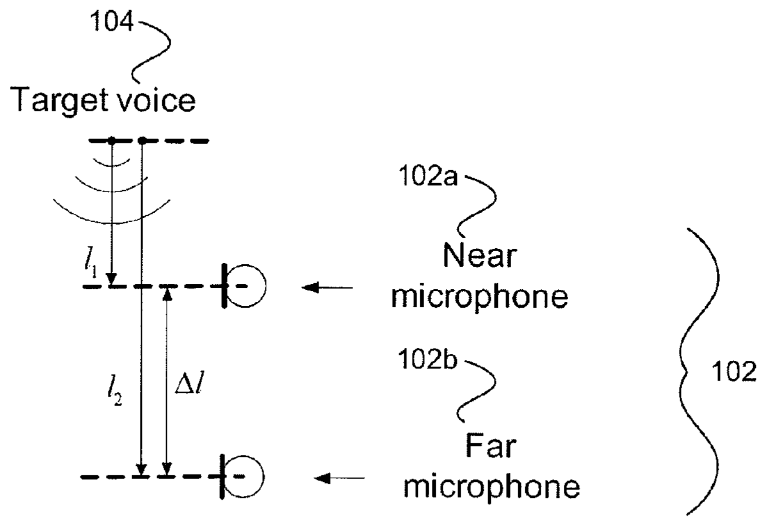
FIG. 1 is a diagram that illustrates a general microphone configuration according to an embodiment of the present invention.

Described herein are techniques for voice activity detection. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various method and processes are described below. That they are described in a certain order is mainly for ease of presentation. It is to be understood that particular steps may be performed in other orders or in parallel as desired according to various implementations. When a particular step must precede or follow another, such will be pointed out specifically when not evident from the context.

Overview

Embodiments of the present invention improve VAD systems. According to an embodiment, a two-microphone array based VAD system is disclosed. In such embodiment, the microphone array is set up such that one microphone is placed closer than the other to the target sound source. The VAD decision is made by comparing the signal levels of the outputs of the microphone array. According to an embodiment, more than two microphones may be used in a similar manner.

Further according to an embodiment, the present invention includes a method of voice activity detection. The method includes receiving a first signal at a first microphone and a second signal at a second microphone. The second microphone is displaced from the first microphone. The first signal includes a first target component and a first disturbance component, and the second signal includes a second target component and a second disturbance component. The first target component differs from the second target component in accordance with the distance between the microphones, and the first disturbance component differs from the second disturbance component in accordance with the distance between the microphones. The method further includes estimating a first signal level based on the first signal, estimating a second signal level based on the second signal, estimating a first noise level based on the first signal, and estimating a second noise level based on the second signal. The method further includes calculating a first ratio based on the first signal level and the first noise level, and calculating a second ratio based on the second signal level and the second noise level. The method further includes calculating a current voice activity decision based on a difference between the first ratio and the second ratio.

According to an embodiment, a voice activity detector system includes a first microphone, a second microphone, a signal level estimator, a noise level estimator, a first divider, a second divider, and a voice activity detector. The first microphone receives a first signal including a first target component and a first disturbance component. The second microphone is displaced from the first microphone. The second microphone receives a second signal including a second target component and a second disturbance component. The first target component differs from the second target component, and the first disturbance component differs from the second disturbance component, in accordance with the distance between the microphones. The signal level estimator estimates a first signal level based on the first signal and estimates a second signal level based on the second signal. The noise level estimator estimates a first noise level based on the first signal and estimates a second noise level based on the second signal. The first divider calculates a first ratio based on the first signal level and the first noise level. The second divider calculates a second ratio based on the second signal level and the second noise level. The voice activity detector calculates a current voice activity decision based on a difference between the first ratio and the second ratio.

The embodiments of the present invention may be performed as a method or process. The methods may be implemented by electronic circuitry, as hardware or software or a combination thereof. The circuitry used to implement the process may be dedicated circuitry (that performs only a specific task) or general circuitry (that is programmed to perform one or more specific tasks).

Example Configurations, Processes and Implementations

According to an embodiment of the present invention, a robust VAD system looks at a different aspect of the difference between the target speech and the disturbance signal. In many voice communication applications, e.g., telephone, mobile phone, etc, the source of the target speech is usually within a very short range of the microphone; while the disturbance signals usually come from sources that are much far away. For example, in mobile phone, the distance between the microphone and the mouth is in the range of 2~10 cm; while the disturbances usually happens at least couple of meters away from the microphone. From the sound wave propagation theory it is known that in former case, the level of the recorded signal will be very sensitive to microphone location, in such a way that the closer the sound source is to the microphone, the larger the signal level will be picked up; and this sensitivity vanishes if the signal is from a far distance as in the later case. Unlike the statistical differences described above this difference is related to the geometrical locations of the sound source and as a result it is robust and highly predictable. This gives a very robust feature to differentiate the target sound signal from the disturbances.

To exploit this feature, according to an embodiment of the VAD system a small-scale two-microphone array is used. The microphone array is set up in such a way that one microphone is placed closer than the other to the target sound source. The VAD decision thus is made by monitoring the signal levels of the outputs of these two microphones. The detailed implementation of an embodiment of this invention is further disclosed in the rest of this document.

Example Configuration of Microphone Array

FIG. 1 is a block diagram that conceptually illustrates a configuration of an example microphone array 102 used in an embodiment of the present invention. The microphone array comprises two microphones: one microphone 102*a* (near microphone) is at a distance $l_1$ to the target sound source 104, while the other microphone 102*b* (far microphone) is placed at a distance $l_2$ to the target sound source 104. Here $l_1 < l_2$. In addition, these two microphones 102*a* and 102*b* are sufficiently close to each other so that so that they can be taken as located at roughly the same location from the point of view of distant disturbances. According to an embodiment, this condition is satisfied if the distance Δl between these two microphones 102*a* and 102*b* is of an order or orders of magnitude smaller compared to its distance to the disturbance, which is usually true in actual applications where the microphone array can have a size of several centimeters.

According to an embodiment, the distance Δl between these two microphones 102*a* and 102*b* is at least an order of magnitude less than the distance to the source of the disturbance signal. For example, if the source of the disturbance signal is anticipated to be 1 meter from the microphone 102*a* (or 102*b*), the distance Δl between these two microphones may be 2 centimeters.

According to an embodiment, the distance Δl between these two microphones 102*a* and 102*b* is within an order of magnitude of the distance to the source of the target signal. For example, if the source of the target signal is anticipated to be 2 centimeters from the microphone 102*a* (or 102*b*), the distance $\Delta l$ between these two microphones may be 3 centimeters.

According to an embodiment, the distance between the microphone 102*a* (or 102*b*) and the source of the target signal is more than an order of magnitude less than the distance between the microphone 102*a* (or 102*b*) and the source of the disturbance signal. For example, if the source of the target signal is anticipated to be 5 centimeters from the microphone 102*a* (or 102*b*), the distance to the source of the disturbance signal may be 51 centimeters.

In summary, according to an embodiment, the source of the target signal may be 5 centimeters away from the microphone 102*a* (or 102*b*), the disturbances may be at least 1 meter away from the microphone 102*a* (or 102*b*), and the distance between two microphones 102*a* and 102*b* may be 3 centimeters.

Figure 2:
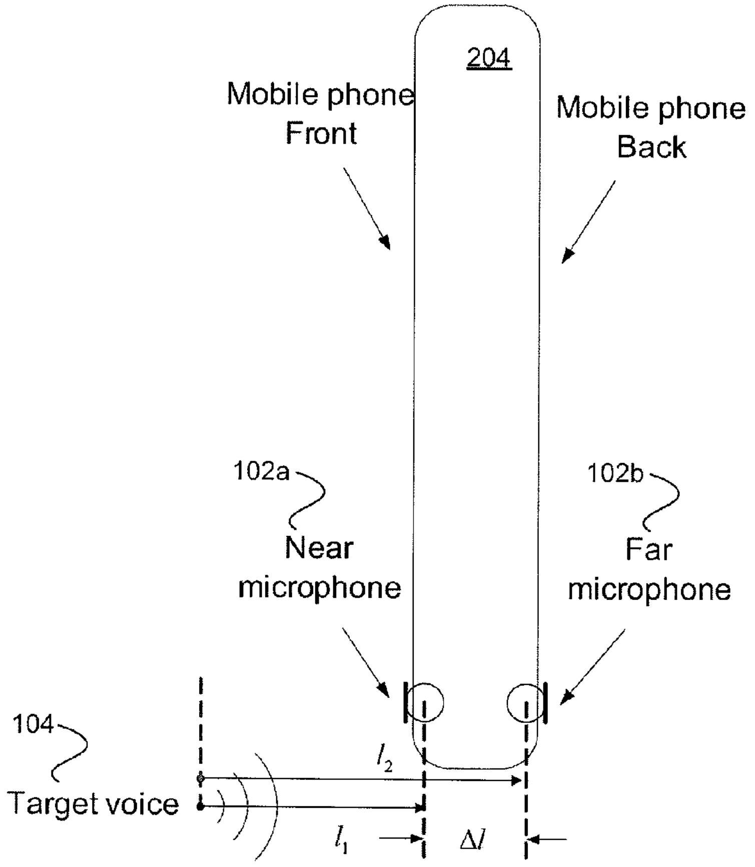
FIG. 2 is a diagram that illustrates a device that includes an example dual microphone voice activity detector according to an embodiment of the present invention.

FIG. 2 is a block diagram that gives an example of a microphone array 102 that satisfies the above requirements. Here the near microphone 102*a* is placed at the front of a mobile phone 204 and the far microphone 102*b* is placed at the back of the mobile phone 204. In this particular example $l_1$=3~5 (cm), $l_2$=5~7 (cm) and $\Delta l$=2~3 (cm).

Example VAD Decision

Figure 3:
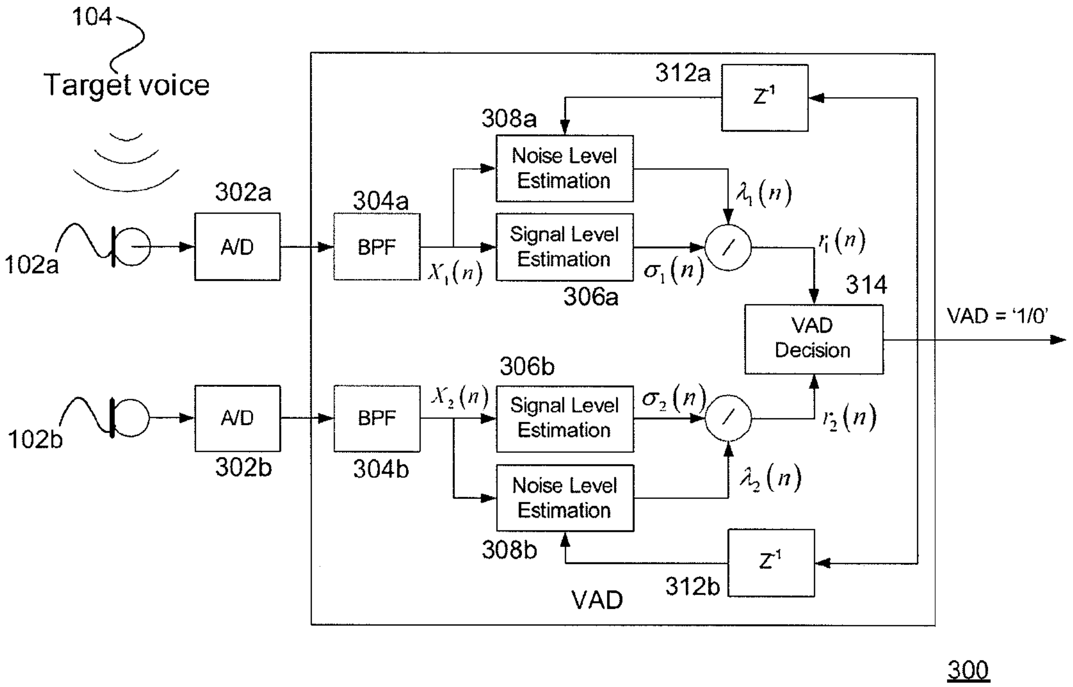
FIG. 3 is a block diagram that illustrates an example voice activity detector system according to an embodiment of the present invention.

FIG. 3 is a block diagram of an example VAD system 300 according to an embodiment of the present invention. The VAD system 300 includes a near microphone 102*a*, a far microphone 102*b*, analog to digital converters 302*a* and 302*b*, band pass filters 304*a* and 304*b*, signal level estimators 306*a* and 306*b*, noise level estimators 308*a* and 308*b*, dividers 310*a* and 310*b*, unit delay elements 312*a* and 312*b*, and a VAD decision block 314. These elements of the VAD system 300 perform various functions as set forth below.

In the VAD system 300 the analog outputs from the microphone array 102 are digitized into PCM (Pulse Code Modulation) signals by the analog to digital converters 302*a* and 302*b*. To improve the robustness of the algorithm, the frequency range that has significant speech energy may be examined. This can be achieved by processing the digitized signals with a pair of Band Pass Filters (BPF) 304*a* and 304*b* with band-pass frequencies ranging from 400~1000 Hz.

In the signal level estimation blocks 306*a* and 306*b* the levels of the signals $X_i(n)$ outputted from the BPFs 304*a* and 304*b* are estimated. Conveniently, the level estimation may be done by performing a recursive averaging operation on the power of the signal $X_i(n)$ as follows:

$$\sigma_i(n)=\alpha|X_i(n)|^2+(1-\alpha)\sigma_i(n-1),\ i=1,2$$

where $0<\alpha<1$ is a small value close to zero, and $\sigma_i(0)$ is initialized to zero.

Assume that signal $X_1(n)$ is from the near microphone 102*a* and $X_2(n)$ is from the far microphone 102*b*. Now, if the level estimation for signal $X_1(n)$ is $\sigma_1(n)=\lambda_d(n)+\lambda_x(n)$, where $\lambda_d(n)$ is the level of the components from the disturbance signal and $\lambda_x(n)$ is from the target signal, the level of signal $X_2(n)$ will be given by $$\sigma_2(n)=g[\lambda_d(n)+p\lambda_x(n)]$$

Here g is the gain difference between the far and near microphones 102*b* and 102*a*; and p is due to the signal propagation decay. In an ideal condition, the level of the recorded sound is inversely proportional to the power of the distance of the sound to the microphone. See, for example, J. G. Ryan and R. A. Goubran, "Optimal nearfield responses for microphone array," in Proc. IEEE Workshop Applicat. Signal Processing to Audio Acoust., (New Paltz, N.Y., USA, 1997). In this case p is given by:

$$p=(l_1/l_2)^2$$

where and $l_1$ and $l_2$ are the distances of the target sound to the near and far microphones 102*a* and 102*b* respectively. In practical applications, p may depend on the actual acoustic setup of the microphone array and its value may be obtained by measurement. Note that it is assumed that the levels of the disturbance signals from the two microphones are the same after the microphone gain difference has been compensated since in this case the difference of the propagation decay between these two microphones is negligible.

The VAD system 300 also monitors the levels of the disturbance in $X_1(n)$ and $X_2(n)$ as:

$$\lambda_i(n)=\begin{cases}\beta|X_i(n)|^2+(1-\beta)\lambda_i(n-1) & VAD(n-1)=0\\ \lambda_i(n-1) & \text{else,}\end{cases}$$

$$i=1,2$$

where $0<\beta<1$ is a small value close to zero, and $\lambda_i(0)$ is initialized to zero. Here only the samples that have been classified as disturbance (VAD=0) are included in the estimation. Since the VAD decision of the current sample is not made yet, the VAD decision of the previous sample is used here instead (via the delays 312*a* and 312*b*). Similarly, assuming $\lambda_1(n)=\bar{\lambda}_d(n)$, $\lambda_2(n)$ will be given by:

$$\lambda_2(n)=g\bar{\lambda}_d(n)$$

because of the gain difference between the far and near microphones.

In general, $\lambda_d(n)\neq\bar{\lambda}_d(n)$, although both are estimated levels of the disturbances. This is because the time constants used in these two level estimators ($\alpha$ and $\beta$) are different. Usually, a larger value of $\alpha$ may be selected since it is desirable that the signal level estimator's response is fast enough when the target is present; and a smaller value for $\beta$ to allow a smooth estimation of the disturbance level. For this reason, $\lambda_d(n)$ is referred to as the short-time estimation of the disturbance level; and $\bar{\lambda}_d(n)$ is referred to as the long-time estimation of the disturbance level. According to an embodiment, $\alpha$=0.1 and $\beta$=0.01. In other embodiments, the values of $\alpha$ and $\beta$ may be adjusted depending on the characteristics of the target signal and the disturbance signal. These two values may be set empirically, depending on the characteristics of the signals.

In the VAD system the following ratios are further computed:

$$r_1(n)\triangleq\frac{\sigma_1(n)}{\lambda_1(n)}=\gamma(n)+\xi(n)$$

and $$r_2(n)\triangleq\frac{\sigma_2(n)}{\lambda_2(n)}=\gamma(n)+p\xi(n)$$

where $\gamma(n)\triangleq\lambda_d(n)/\bar{\lambda}_d(n)$ is the ratio of the short-time and the long-time estimation of the disturbance level at the near microphone 102*a*, and $\xi(n)\triangleq\lambda_x(n)/\bar{\lambda}_d(n)$ is the ratio of the estimations of the target signal level and the disturbance level at the near microphone 102*a*. Notice the unknown microphone gain difference g has been canceled out in these two ratios.

The VAD decision is actually based on the difference between these two ratios:

$$u(n) \triangleq r_1(n) - r_2(n) = (1-p)\xi(n)$$

Clearly, the components of the distant disturbances has been cancelled out in u(n), leaving only the components from the target speech signal. This will give a very robust indication of whether the target speech signal is present or not in the input signal. According to a further embodiment, in one implementation the VAD decision is determined by comparing the value of u(n) to a pre-selected threshold as follows:

$$VAD(n) = \begin{cases} 0 & u(n) < (1-p)\xi_{min} \\ 1 & \text{else} \end{cases}$$

where $\xi_{min}$ is a pre-selected minimum SNR threshold for voice presence at the near microphone 102*a*. The value of $\xi_{min}$ decides the sensitivity of the VAD and its optimal value may depend on the levels of the target speech and the disturbance in the input signal. Therefore, its value is best set by experiments on the specific components used in the VAD. Experiments have shown satisfactory results by setting this threshold to value 1.

Example Consideration for Wind Noise

Wind noise is a special type of disturbance. It may be caused by the turbulence of air which is generated when the air flow of the wind is blocked by an object with uneven edges. In contrast to some other disturbances, wind noise can happen at a location that is very close to the microphone, e.g., at the edges of the recording device or the microphone. When this happens, large values of u(n) may be generated even when the target speech is not present, leading to the false alarm problems. Thus, an embodiment of the VAD decision block 314 further detects wind noise with computation and/or analysis of the ratio between $r_1(n)$ and $r_2(n)$:

$$v(n) \triangleq r_1(n)/r_2(n)$$

If the wind noise is not present, this gives $$v(n) = \frac{1+\psi(n)}{1+p\psi(n)}$$

where $\psi(n) \triangleq \lambda_x(n)/\lambda_d(n)$. The value v(n) thus takes a value between 1 and 1/p depending on the actual value of ψ(n). On the other hand, if wind noise is present, it likely occurs at a different location in relation to source of target speech, and hence, v(n) may fall outside its normal range. This provides an indication of the presence of the wind noise. Based on this fact, the following decision rule is used in the system which has been shown to be very robust to the wind noise disturbance:

$$VAD(n) = \begin{cases} 1 & u(n) \geq (1-p)\xi_{min} \text{ AND } \frac{1}{\varepsilon} < v(n) < \frac{\varepsilon}{p} \\ 0 & \text{else} \end{cases}$$

Here ϵ is a constant slightly larger than 1, which may provide a degree of error tolerance for the VAD system 300. According to an embodiment, the value of e may be 1.20. The selection of the value used for ϵ may be adjusted in other embodiments to adjust the sensitivity of the VAD to wind noise.

Figure 4:
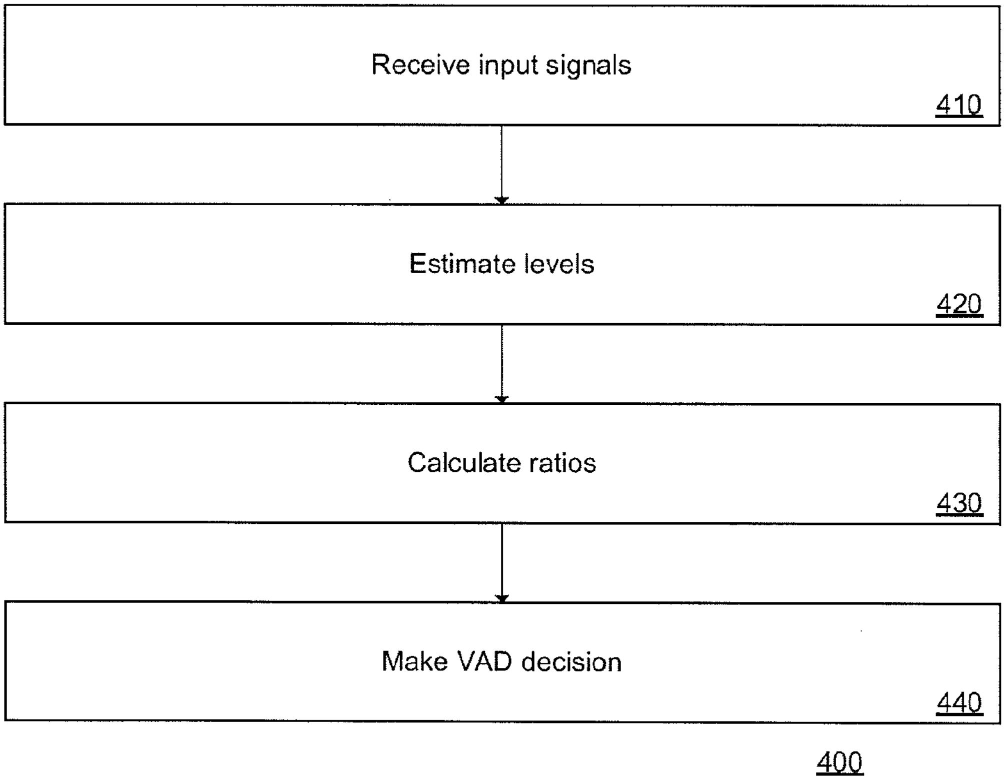
FIG. 4 is a flow diagram of an example method of voice activity detection according to an embodiment of the present invention.

FIG. 4 is a flow diagram of an example method 400, according to an embodiment of the present invention. The method 400 may be implemented by, for example, the voice activity detector system 300 (see FIG. 3).

In step 410, the input signals to the system are received by the microphones. In a system with two microphones, the first microphone is closer to the source of the target signal (e.g., the user's voice) than the second microphone, but the distance to the source of the disturbance signal (e.g., the noise) is much greater than both the distance to the source of the target signal and the distance between microphones. For example, in the system 300 (see FIG. 3), the microphone 102*a* is closer to the target source than the microphone 102*b*, yet both microphones 102*a* and 102*b* are relatively far away from the disturbance source (not shown).

In step 420, the signal level and the noise level at each microphone are estimated. For example, in the system 300 (see FIG. 3), the signal level estimator 306*a* estimates the signal level at the first microphone, the noise level estimator 308*a* estimates the noise level at the first microphone, the signal level estimator 306*b* estimates the signal level at the second microphone, and the noise level estimator 308*b* estimates the noise level at the second microphone. As an example, a combined level estimator estimates two or more of the four levels, for example according to a time share basis.

As discussed above with reference to FIG. 3, the noise level estimation may take into account the previous voice activity detection decision.

In step 430, the ratio of signal level to noise level at each microphone is calculated. For example, in the system 300 (see FIG. 3), the divider 310*a* calculates the ratio at the first microphone, and the divider 310*b* calculates the ratio at the second microphone. As an example, a combined divider may calculate both ratios, for example according to a time share basis.

In step 440, the current voice activity detection decision is made according to the difference between the two ratios. For example, in the system 300 (see FIG. 3), the VAD detector 314 indicates the presence of voice activity when the difference exceeds a defined threshold.

Each of the above described steps may include substeps. The details of the substeps may be as described above with reference to FIG. 3 and (for brevity) are not repeated.

An Example Interpretation for the VAD Decision Rule

In principle, u(n) is the difference between the output signal level between the far and the near microphones 102*b* and 102*a*, after the gain difference between these two microphones has been compensated. This difference in effect gives an indication of the energy of the sound events occurring very close to the microphone. According to an embodiment, the difference is further normalized by the disturbance level so that only close-by sound with significant energy will be tagged as the target speech signal.

The value r(n) is the ratio between the output signal level between the far and the near microphones 102*b* and 102*a*, after the gain difference between these two microphones has been compensated. For the target speech signal, r(n) will fall into a normal range which is determined by the acoustic setup of the microphone array 102. For wind noise, r(n) may fall outside its normal range. This phenomenon is employed in an embodiment of the VAD system 300 to differentiate wind noise from the target speech signal.

A design of the VAD system 300 may vary somewhat from the example embodiments described in previous sections, for implementation in various types of voice systems, including mobile phones, headsets, video conferencing systems, gaming systems, and voice over internet protocol (VoIP) systems, among others.

An example embodiment may include more than two microphones. Using the example embodiment shown in FIG. 3 as a starting point, adding additional microphones involves adding an additional signal path (A/D, BPF, level estimators, divider, delay, etc.) that applies the above-described equations to process the signal for each additional microphone. Following the same principle, the example VAD embodiment may be based on a linear combination of the ratios $r_i(n)$ computed as above from all the microphones:

$$u(n) = \sum_{i=1}^{N} a_i r_i(n)$$

where N is the total number of the microphones and $a_i$, i=1, . . . , N is pre-selected constant that satisfies $$\sum_{i=1}^{N} a_i = 0$$

so that components from far-field disturbances in these ratios are cancelled out in u(n).

The selection of $a_i$ may be performed empirically according to the specific arrangement of elements in a particular implementation. One possible selection of $a_i$, i=1, . . . , N that leads to good performance is $$a_1 = \sum_{i=2}^{N} (1 - p_i), \text{ and}$$

$$a_i = p_i - 1,\ i > 1$$

Here $p_i$ is the level difference of the target sound between $i^{th}$ microphone and the first microphone due to the signal propagation. The VAD decision block 314 then makes the VAD decision by comparing the value of u(n) to a pre-selected threshold as described above.

$$VAD(n) = \begin{cases} 0 & u(n) < \left(a_1 + \sum_{i=2}^{N} a_i p_i\right)\xi_{min} \\ 1 & \text{else} \end{cases}$$

Example Implementations

Embodiments of the present invention may be implemented in hardware or software, or a combination of both (e.g., programmable logic arrays). Unless otherwise specified, the algorithms included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perforin the functions described herein.

According to an embodiment, a method of performing voice activity detection includes receiving a first signal from a first microphone. The first signal including a first target component and a first disturbance component. The method further includes receiving a second signal from a second microphone displaced from the first microphone by a distance. The second signal includes a second target component and a second disturbance component. The first target component differs from the second target component in accordance with the distance, and the first disturbance component differs from the second disturbance component in accordance with the distance. The method further includes estimating a first signal level based on the first signal, estimating a second signal level based on the second signal, estimating a first noise level based on the first signal, and estimating a second noise level based on the second signal. The method further includes calculating a first ratio based on the first signal level and the first noise level, and calculating a second ratio based on the second signal level and the second noise level. The method further includes calculating a current voice activity decision based on a difference between the first ratio and the second ratio.

According to an embodiment, the method further includes performing band pass filtering on the first signal prior to estimating the first signal level, and performing band pass filtering on the second signal prior to estimating the second signal level. A band pass frequency ranges between 400 and 1000 Hertz.

According to an embodiment, the distance between the first microphone and the second microphone is at least an order of magnitude less than a second distance between the first microphone and a disturbance source of the disturbance component. According to an embodiment, the distance between the first microphone and the second microphone is within an order of magnitude of a second distance between the first microphone and a target source of the target component, and the distance between the first microphone and the second microphone is at least an order of magnitude less than a third distance between the first microphone and a disturbance source of the disturbance component. According to an embodiment, the first microphone is a first distance away from a target source of the target component and a second distance away from a disturbance source of the disturbance component, and the first distance is more than an order of magnitude less than the second distance.

According to an embodiment, estimating the first signal level includes estimating the first signal level by performing a recursive averaging operation on a power level of the first signal.

According to an embodiment, estimating the first noise level includes estimating the first noise level by performing, as indicated by a previous voice activity decision, a recursive averaging operation on a power level of the first signal.

According to an embodiment, estimating the first signal level includes estimating the first signal level by performing a recursive averaging operation on a power level of the first signal using a first time constant, and estimating the first noise level includes estimating the first noise level by performing, as indicated by a previous voice activity decision, a recursive averaging operation on a power level of the first signal using a second time constant, wherein the first time constant is greater than the second time constant.

According to an embodiment, the method further includes detecting a wind noise based on a third ratio between the first ratio and the second ratio, wherein calculating the current voice activity decision includes calculating the current voice activity decision based on the wind noise and on the difference between the first ratio and the second ratio.

According to an embodiment, a method of performing voice activity detection includes receiving multiple signals from multiple microphones, wherein the multiple signals include respectively multiple target components and multiple disturbance components, wherein the multiple microphones are respectively displaced from one another according to multiple distances, wherein the multiple target components differ respectively therebetween according to the multiple distances, and wherein the multiple disturbance components differ respectively therebetween according to the multiple distances. The method further includes estimating multiple signal levels based on the multiple signals (for example, the signal level of each signal is estimated). The method further includes estimating multiple noise levels based on the multiple signals (for example, the noise level of each signal is estimated). The method further includes calculating multiple ratios based on the multiple signal levels and the multiple noise levels (for example, for a signal from a particular microphone, the corresponding signal level and corresponding noise level result in a ratio corresponding to that microphone). The method further includes detecting a wind noise based on a wind noise ratio between the multiple ratios. The method further includes adjusting the multiple ratios according to multiple constants. (As an example, the constant applied to the ratio corresponding to the second microphone results from the level difference between the first microphone and the second microphone). The method further includes calculating a current voice activity decision based on the wind noise and on a sum of the multiple ratios having been adjusted.

According to an embodiment, an apparatus includes a circuit that performs voice activity detection. The apparatus includes a first microphone, a second microphone, a signal level estimator, a noise level estimator, a first divider, a second divider, and a voice activity detector. The a first microphone receives a first signal including a first target component and a first disturbance component. The second microphone is displaced from the first microphone by a distance. The second microphone receives a second signal including a second target component and a second disturbance component. The first target component differs from the second target component in accordance with the distance, and the first disturbance component differs from the second disturbance component in accordance with the distance. The signal level estimator estimates a first signal level based on the first signal and estimates a second signal level based on the second signal. The noise level estimator estimates a first noise level based on the first signal and estimates a second noise level based on the second signal. The first divider calculates a first ratio based on the first signal level and the first noise level. The second divider calculates a second ratio based on the second signal level and the second noise level. The voice activity detector calculates a current voice activity decision based on a difference between the first ratio and the second ratio. The apparatus otherwise operates in a manner similar to that described above regarding the method.

A computer-readable medium may embody a computer program that controls a processor to execute processing in a manner similar to that described above regarding the method.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of performing voice activity detection, comprising:

receiving a first signal from a first microphone, the first signal including a first target component and a first disturbance component;

receiving a second signal from a second microphone displaced from the first microphone by a distance, the second signal including a second target component and a second disturbance component, wherein the first target component differs from the second target component in accordance with the distance, and wherein the first disturbance component differs from the second disturbance component in accordance with the distance;

estimating a first signal level based on the first signal;

estimating a second signal level based on the second signal;

estimating a first noise level based on the first signal;

estimating a second noise level based on the second signal;

calculating a first ratio based on the first signal level and the first noise level;

calculating a second ratio based on the second signal level and the second noise level;

calculating a current voice activity decision, wherein the current voice activity decision signifies that no voice activity is detected if a difference between the first ratio and the second ratio is smaller than a pre-selected threshold, wherein the threshold is $(1-p)\,\xi min$, wherein p is a propagation decay factor and wherein $\xi min$ is a pre-selected minimum SNR threshold for voice presence at the microphone closer to the target sound, and wherein the current voice activity decision signifies that voice activity is detected if the difference is larger than or equal to the pre-selected threshold; and selectively transmitting the first signal according to the current voice activity decision.

2. A method of performing voice activity detection, comprising:

receiving a first signal from a first microphone, the first signal including a first target component and a first disturbance component;

receiving a second signal from a second microphone displaced from the first microphone by a distance, the second signal including a second target component and a second disturbance component, wherein the first target component differs from the second target component in accordance with the distance, and wherein the first disturbance component differs from the second disturbance component in accordance with the distance;

performing band pass filtering on the first signal prior to estimating the first signal level;

performing band pass filtering on the second signal prior to estimating the second signal level, wherein a band pass frequency ranges between 400 and 1000 Hertz;

estimating a first signal level based on the first signal;

estimating a second signal level based on the second signal;

estimating a first noise level based on the first signal;

estimating a second noise level based on the second signal;

calculating a first ratio based on the first signal level and the first noise level;

calculating a second ratio based on the second signal level and the second noise level;

calculating a current voice activity decision based on a difference between the first ratio and the second ratio; and selectively transmitting the first signal according to the current voice activity decision.

3. A method of performing voice activity detection, comprising:

receiving a first signal from a first microphone, the first signal including a first target component and a first disturbance component;

receiving a second signal from a second microphone displaced from the first microphone by a distance, the second signal including a second target component and a second disturbance component, wherein the first target component differs from the second target component in accordance with the distance, and wherein the first disturbance component differs from the second disturbance component in accordance with the distance;

estimating a first signal level based on the first signal;

estimating a second signal level based on the second signal;

estimating a first noise level based on the first signal;

estimating a second noise level based on the second signal;

calculating a first ratio based on the first signal level and the first noise level;

calculating a second ratio based on the second signal level and the second noise level;

detecting a wind noise based on a third ratio between the first ratio and the second ratio;

calculating a current voice activity decision based on the wind noise and on a difference between the first ratio and the second ratio; and selectively transmitting the first signal according to the current voice activity decision.

4. The method of claim 3, wherein the distance between the first microphone and the second microphone is at least an order of magnitude less than a second distance between the first microphone and a disturbance source of the disturbance component.

5. The method of claim 3, wherein the distance between the first microphone and the second microphone is within an order of magnitude of a second distance between the first microphone and a target source of the target component, and wherein the distance between the first microphone and the second microphone is at least an order of magnitude less than a third distance between the first microphone and a disturbance source of the disturbance component.

6. The method of claim 3, wherein the first microphone is a first distance away from a target source of the target component and a second distance away from a disturbance source of the disturbance component, and wherein the first distance is more than an order of magnitude less than the second distance.

7. The method of claim 3, wherein estimating the first signal level comprises estimating the first signal level by performing a recursive averaging operation on a power level of the first signal.

8. The method of claim 3, wherein estimating the first noise level comprises estimating the first noise level by performing, as indicated by a previous voice activity decision, a recursive averaging operation on a power level of the first signal.

9. The method of claim 3, wherein:

estimating the first signal level comprises estimating the first signal level by performing a recursive averaging operation on a power level of the first signal using a first time constant; and estimating the first noise level comprises estimating the first noise level by performing, as indicated by a previous voice activity decision, a recursive averaging operation on a power level of the first signal using a second time constant, wherein the first time constant is greater than the second time constant.

10. An apparatus including a circuit that performs voice activity detection, the apparatus comprising:

a first microphone that is configured for receiving a first signal including a first target component and a first disturbance component;

a second microphone, displaced from the first microphone by a distance, that is configured for receiving a second signal including a second target component and a second disturbance component, wherein the first target component differs from the second target component in accordance with the distance, and wherein the first disturbance component differs from the second disturbance component in accordance with the distance;

a signal level estimator that is configured for estimating a first signal level based on the first signal and that is configured for estimating a second signal level based on the second signal;

a noise level estimator that is configured for estimating a first noise level based on the first signal and that is configured for estimating a second noise level based on the second signal;

a first divider that is configured for calculating a first ratio based on the first signal level and the first noise level;

a second divider that is configured for calculating a second ratio based on the second signal level and the second noise level; and a voice activity detector that is configured for calculating a current voice activity decision, wherein the current voice activity decision signifies that no voice activity is detected if a difference between the first ratio and the second ratio is smaller than a pre-selected threshold, wherein the threshold is $(1-p)\ \xi min$, wherein p is a propagation decay factor and wherein $\xi min$ is a pre-selected minimum SNR threshold for voice presence at the microphone closer to the target sound, and wherein the current voice activity decision signifies that voice activity is detected if the difference is larger than or equal to the pre-selected threshold.

11. An apparatus including a circuit that performs voice activity detection, the apparatus comprising:

a first microphone that is configured for receiving a first signal including a first target component and a first disturbance component;

a second microphone, displaced from the first microphone by a distance, that is configured for receiving a second signal including a second target component and a second disturbance component, wherein the first target component differs from the second target component in accordance with the distance, and wherein the first disturbance component differs from the second disturbance component in accordance with the distance;

a signal level estimator that is configured for estimating a first signal level based on the first signal and that is configured for estimating a second signal level based on the second signal;

a band pass filter, coupled between the first microphone and the signal level estimator, and coupled between the second microphone and the signal level estimator, that is configured for performing band pass filtering on the first signal and on the second signal, wherein a band pass frequency ranges between 400 and 1000 Hertz;

a noise level estimator that is configured for estimating a first noise level based on the first signal and that is configured for estimating a second noise level based on the second signal;

a first divider that is configured for calculating a first ratio based on the first signal level and the first noise level;

a second divider that is configured for calculating a second ratio based on the second signal level and the second noise level; and a voice activity detector that is configured for calculating a current voice activity decision based on a difference between the first ratio and the second ratio.

12. An apparatus including a circuit that performs voice activity detection, the apparatus comprising:

a first microphone that is configured for receiving a first signal including a first target component and a first disturbance component;

a second microphone, displaced from the first microphone by a distance, that is configured for receiving a second signal including a second target component and a second disturbance component, wherein the first target component differs from the second target component in accordance with the distance, and wherein the first disturbance component differs from the second disturbance component in accordance with the distance;

a signal level estimator that is configured for estimating a first signal level based on the first signal and that is configured for estimating a second signal level based on the second signal;

a noise level estimator that is configured for estimating a first noise level based on the first signal and that is configured for estimating a second noise level based on the second signal;

a first divider that is configured for calculating a first ratio based on the first signal level and the first noise level;

a second divider that is configured for calculating a second ratio based on the second signal level and the second noise level; and a voice activity detector that is configured for calculating a current voice activity decision based on a difference between the first ratio and the second ratio, wherein the voice activity detector is further configured for detecting a wind noise based on a third ratio between the first ratio and the second ratio, and wherein the voice activity detector is configured for calculating the current voice activity decision based on the wind noise and on the difference between the first ratio and the second ratio.

13. The apparatus of claim 12, wherein the distance between the first microphone and the second microphone is at least an order of magnitude less than a second distance between the first microphone and a disturbance source of the disturbance component.

14. The apparatus of claim 12, wherein the distance between the first microphone and the second microphone is within an order of magnitude of a second distance between the first microphone and a target source of the target component, and wherein the distance between the first microphone and the second microphone is at least an order of magnitude less than a third distance between the first microphone and a disturbance source of the disturbance component.

15. The apparatus of claim 12, wherein the first microphone is a first distance away from a target source of the target component and a second distance away from a disturbance source of the disturbance component, and wherein the first distance is more than an order of magnitude less than the second distance.

16. The apparatus of claim 12, wherein the signal level estimator is configured for estimating the first signal level by performing a recursive averaging operation on a power level of the first signal.

17. The apparatus of claim 12, further comprising:

a delay element, coupled between the noise level estimator and the voice activity detector, that is configured for storing a previous voice activity decision;

wherein the noise level estimator is configured for estimating the first noise level by performing, as indicated by the previous voice activity decision, a recursive averaging operation on a power level of the first signal.

18. The apparatus of claim 12, further comprising:

a delay element, coupled between the noise level estimator and the voice activity detector, that is configured for storing a previous voice activity decision;

wherein the signal level estimator is configured for estimating the first signal level by performing a recursive averaging operation on a power level of the first signal, and wherein the noise level estimator is configured for estimating the first noise level by performing, as indicated by the previous voice activity decision, a recursive averaging operation on a power level of the first signal.

19. The apparatus of claim 12, wherein:

the signal level estimator is configured for estimating the first signal level by performing a recursive averaging operation on a power level of the first signal using a first time constant; and the noise level estimator is configured for estimating the first noise level by performing, as indicated by a previous voice activity decision, a recursive averaging operation on a power level of the first signal using a second time constant, wherein the first time constant is greater than the second time constant.

20. The apparatus of claim 12, wherein:

the signal level estimator comprises a first signal level estimator coupled between the first microphone and the first divider, and a second signal level estimator coupled between the second microphone and the second divider; and the noise level estimator comprises a first noise level estimator coupled between the first microphone and the first divider, and a second noise level estimator coupled between the second microphone and the second divider.

21. An apparatus for performing voice activity detection, comprising:

a first microphone that is configured for receiving a first signal including a first target component and a first disturbance component;

a second microphone, displaced from the first microphone by a distance, that is configured for receiving a second signal including a second target component and a second disturbance component, wherein the first target component differs from the second target component in accordance with the distance, and wherein the first disturbance component differs from the second disturbance component in accordance with the distance;

means for estimating a first signal level based on the first signal, for estimating a second signal level based on the second signal, for estimating a first noise level based on the first signal, and for estimating a second noise level based on the second signal;

means for calculating a first ratio based on the first signal level and the first noise level, and for calculating a second ratio based on the second signal level and the second noise level; and means for detecting a wind noise based on a third ratio between the first ratio and the second ratio, and for calculating a current voice activity decision based on the wind noise and on a difference between the first ratio and the second ratio.

22. A tangible computer-readable storage medium that comprises instructions or a computer program for performing voice activity detection, the instructions or computer program controlling a processor to execute processing, the processing comprising:

receiving a first signal from a first microphone, the first signal including a first target component and a first disturbance component;

receiving a second signal from a second microphone displaced from the first microphone by a distance, the second signal including a second target component and a second disturbance component, wherein the first target component differs from the second target component in accordance with the distance, and wherein the first disturbance component differs from the second disturbance component in accordance with the distance;

estimating a first signal level based on the first signal;

estimating a second signal level based on the second signal;

estimating a first noise level based on the first signal;

estimating a second noise level based on the second signal;

calculating a first ratio based on the first signal level and the first noise level;

calculating a second ratio based on the second signal level and the second noise level;

detecting a wind noise based on a third ratio between the first ratio and the second ratio; and calculating a current voice activity decision based on the wind noise and on a difference between the first ratio and the second ratio.

23. A method of performing voice activity detection, comprising:

receiving a plurality of signals from a plurality of microphones, wherein the plurality of signals include respectively a plurality of target components and a plurality of disturbance components, wherein the plurality of microphones are respectively displaced from one another according to a plurality of distances, wherein the plurality of target components differ respectively therebetween according to the plurality of distances, and wherein the plurality of disturbance components differ respectively therebetween according to the plurality of distances;

estimating a plurality of signal levels based respectively on the plurality of signals;

estimating a plurality of noise levels based respectively on the plurality of signals;

calculating a plurality of ratios based on the plurality of signal levels, respectively, and the plurality of noise levels, respectively;

detecting a wind noise based on a wind noise ratio between the plurality of ratios;

adjusting the plurality of ratios according to a plurality of constants, respectively; and calculating a current voice activity decision based on the wind noise and on a sum of the plurality of ratios having been adjusted; and selectively transmitting one of the plurality of signals according to the current voice activity decision.

* * * * *